(12) United States Patent
Byun et al.

(10) Patent No.: US 8,557,418 B2
(45) Date of Patent: Oct. 15, 2013

(54) RECHARGEABLE BATTERY COMPRISING SHORT CIRCUIT UNIT RESPONSIVE TO PRESSURE AND MODULE THEREOF

(75) Inventors: Sang-Won Byun, Suwon-si (KR); Yong-Sam Kim, Suwon-si (KR); Dae-Won Han, Suwon-si (KR); Byung-Kyu Ahn, Suwon-si (KR); Sung-Bae Kim, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 753 days.

(21) Appl. No.: 12/711,859

(22) Filed: Feb. 24, 2010

(65) Prior Publication Data

US 2010/0227205 A1 Sep. 9, 2010

(30) Foreign Application Priority Data

Mar. 4, 2009 (KR) .................. 10-2009-0018604

(51) Int. Cl.
| | |
|---|---|
| H01M 2/00 | (2006.01) |
| H01M 2/02 | (2006.01) |
| H01M 2/24 | (2006.01) |
| H01M 6/42 | (2006.01) |

(52) U.S. Cl.
USPC ............ 429/61; 429/156; 429/160; 429/176; 429/178

(58) Field of Classification Search
USPC ......... 429/7, 61, 90, 154, 161, 162, 178, 210, 429/152, 160, 176, 156
See application file for complete search history.

(56) References Cited

U.S. PATENT DOCUMENTS

| | | | |
|---|---|---|---|
| 3,141,795 A * | 7/1964 | Eisler ............................ | 429/154 |
| 5,766,801 A | 6/1998 | Inoue et al. | |
| 5,800,937 A | 9/1998 | Decker et al. | |
| 6,004,694 A * | 12/1999 | Van Lerberghe ............. | 429/179 |

(Continued)

FOREIGN PATENT DOCUMENTS

| | | |
|---|---|---|
| JP | 9-120808 A | 5/1997 |
| JP | 09-180698 | 7/1997 |

(Continued)

OTHER PUBLICATIONS

Machine Translation of: JP 2004/319463A, Fujita et al., Nov. 11, 2004.*

(Continued)

*Primary Examiner* — Kenneth Douyette
(74) *Attorney, Agent, or Firm* — Christie, Parker & Hale, LLP

(57) ABSTRACT

A rechargeable battery adapted to prevent or reduce overcharge. A rechargeable battery includes a case containing an electrode assembly; a cap plate coupled to the case and sealing an opening of the case; a first electrode terminal connected to a first electrode of the electrode assembly and electrically connected to the case; a second electrode terminal connected to a second electrode of the electrode assembly and electrically insulated from the case when a pressure inside the case is less than a threshold pressure; and a short-circuit unit including a short-circuit member connected to the second electrode terminal, the short-circuit unit adapted to short-circuit the second electrode terminal to the case by swelling a portion of the case to contact the short-circuit member when the pressure inside the case is equal to or greater than the threshold pressure.

18 Claims, 6 Drawing Sheets

(56) References Cited

U.S. PATENT DOCUMENTS

| | | | |
|---|---|---|---|
| 6,635,380 B1 * | 10/2003 | Shimoda et al. | 429/93 |
| 2006/0093896 A1 * | 5/2006 | Hong et al. | 429/61 |
| 2006/0105237 A1 * | 5/2006 | Oh | 429/180 |
| 2007/0054157 A1 | 3/2007 | Ryu et al. | |
| 2007/0178377 A1 * | 8/2007 | Kim et al. | 429/152 |

FOREIGN PATENT DOCUMENTS

| | | | |
|---|---|---|---|
| JP | 2001-524255 A | 11/2001 | |
| JP | 2003-249419 A | 9/2003 | |
| JP | 2004-111300 A | 4/2004 | |
| JP | 2004-303447 | 10/2004 | |
| JP | 2004-319463 | 11/2004 | |
| JP | 2005-251548 | 9/2005 | |
| JP | 2005-285555 | 10/2005 | |
| JP | 2006-185709 A | 7/2006 | |
| KR | 10-0648732 B1 | 11/2006 | |
| KR | 10-0795680 A | 1/2008 | |
| WO | WO 99/34456 | 7/1999 | |

OTHER PUBLICATIONS

Machine Translation of: JP 2005/251548A, Kouzuki et al., Sep. 15, 2005.*

Machine Translation of: JP 2005/285555A, Tokuhara, Oct. 13, 2005.*

SIPO Office action dated Apr. 28, 2012, for corresponding Chinese Patent application 20101012861.4, with English translation, (10 pages).

European Search Report dated May 11, 2010, for corresponding European Patent application 10155469.9, noting listed references in this IDS, as well as JP 2004-319463 previously filed in an IDS dated Feb. 24, 2010.

KIPO Office Action dated May 27, 2011 for Korean Priority Patent Application No. 10-2009-0018604, noting listed references in this IDS, as well as Japanese Reference No. 2004-319463, previously submitted in an IDS dated Feb. 24, 2010, 5 pages.

English Machine Translation for Japanese Publication No. 2005-28555 listed above, 12 pages.

KIPO Office action dated Sep. 27, 2010 in priority application No. KR 10-2009-0018604, noting JP reference previously filed in an IDS dated Feb. 24, 2010.

JPO Office action dated Aug. 24, 2012 in Japanese application No. 2010-040754 (2 pps).

SIPO Office action dated Jan. 14, 2013, for corresponding Chinese Patent application 201010128614.X, with English translation, (13 pages).

* cited by examiner

RECHARGEABLE BATTERY COMPRISING SHORT CIRCUIT UNIT RESPONSIVE TO PRESSURE AND MODULE THEREOF

CROSS-REFERENCE TO RELATED APPLICATION

This application claims priority to and the benefit of Korean Patent Application No. 10-2009-0018604 filed in the Korean Intellectual Property Office on Mar. 4, 2009, the entire content of which is incorporated herein by reference.

BACKGROUND

1. Field

Embodiments of the present invention relate to a rechargeable battery and a module thereof, and more particularly, to a rechargeable battery and a module thereof that can prevent or reduce overcharge.

2. Description of the Related Art

A large-capacity rechargeable battery may be used as a power supply for driving a motor of an electric vehicle or a hybrid electric vehicle (HEV). A large-capacity rechargeable battery is typically provided with a plurality of rechargeable batteries consisting of unit cells and is formed by connecting the unit cells to each other in series.

A large-capacity rechargeable battery may have a circular or a prismatic shape. The prismatic shape generally provides a better heat radiating performance than the circular shape. Therefore, the prismatic shape is more advantageous than the circular shape with respect to the aspect of safety against overcharge. As a result, circular rechargeable batteries are typically provided with a current interrupt device (CID) for interrupting current in overcharge, while prismatic rechargeable batteries are typically not provided with a CID.

However, recently, because the rechargeable battery adopted in the HEV, the plug-in hybrid electric vehicle (PHEV), and the electric vehicle is required to have high capacity, the size of the rechargeable battery may increase. In the case of the prismatic shape, a difference in heat radiation may be caused inside and outside of the unit cell due to an increase of a thickness thereof, such that safe charging may be difficult to provide.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery and a module thereof for preventing or reducing overcharge.

Embodiments of the present invention provide a rechargeable battery and a module thereof for providing stability from overcharge in a prismatic rechargeable battery having increased thickness.

A rechargeable battery according to one exemplary embodiment of the present invention includes a case containing an electrode assembly; a cap plate coupled to the case and sealing an opening of the case; a first electrode terminal connected to a first electrode of the electrode assembly and electrically connected to the case; a second electrode terminal connected to a second electrode of the electrode assembly and electrically insulated from the case when a pressure inside the case is less than a threshold pressure; and a short-circuit unit including a short-circuit member connected to the second electrode terminal, the short-circuit unit adapted to short-circuit the second electrode terminal to the case by swelling a portion of the case to contact the short-circuit member when the pressure inside the case is equal to or greater than the threshold pressure. The case may have a prismatic hexahedron shape and the short-circuit unit may be on a surface of the case.

The case may include a first surface and a second surface facing each other and each having a substantially same first area; a third surface and a fourth surface facing each other and being between the first and second surfaces, each of the third and fourth surfaces having a substantially same second area smaller than the first area; and a fifth surface facing the opening and having a width substantially equal to a width of the third and fourth surfaces. The short-circuit unit may be on the third surface or the fourth surface. The rechargeable battery may further include an insulating layer on outer surfaces of the case other than the surface having the short-circuit unit thereon.

The first surface or the second surface may extend in a first direction and include cell barriers spaced from each other in a second direction that crosses the first direction, the cell barriers defining at least one flow passage therebetween for passage of a heat transfer medium therethrough. The rechargeable battery may further include an insulating layer on outer surfaces of the cell barriers.

The short-circuit unit may include a swelling induction unit including the portion of the case, the portion of the case having a thickness that is less than a thickness of another portion of the case surrounding the portion, and the short-circuit member may face and be contactable with an outer surface of the portion of the case.

The swelling induction unit may be concave on an inner surface of the portion of the case, and the short-circuit member may include a mounting portion mounted to the second electrode terminal, and a short-circuit end facing and contactable with the swelling induction unit. The short-circuit member may be bent between the mounting portion and the short-circuit end, the mounting portion being substantially horizontal, and the short-circuit end being substantially vertical.

The short-circuit unit may further include a bracket connected to the case and supporting the short-circuit end, and an insulating member between the short-circuit end and the bracket.

The first electrode terminal may be a positive electrode terminal, and the second electrode terminal may be a negative electrode terminal.

The rechargeable battery may include an outer insulator on at least an outer surface of the cap plate, and an inner insulator on an inner surface of the cap plate, and the outer and inner insulators may receive one of the first and second electrode terminals therethrough and electrically insulate the one of the first and second electrode terminals from the cap plate.

A rechargeable battery module according to another embodiment of the present invention includes a plurality of unit cells adjacent one another, and at least one bus bar connecting unit cells of the plurality of unit cells to each other in series, wherein a unit cell of the plurality of unit cells includes a case containing an electrode assembly; a cap plate coupled to the case and sealing an opening of the case; a first electrode terminal connected to a first electrode of the electrode assembly and electrically connected to the case; a second electrode terminal connected to a second electrode of the electrode assembly and electrically insulated from the case when a pressure inside the case is less than a threshold pressure; and a short-circuit unit including a short-circuit member connected to the second electrode terminal, the short-circuit unit adapted to short-circuit the second electrode terminal to the case by swelling a portion of the case to contact the short-circuit member when the pressure inside the case is equal to or greater than the threshold pressure.

As such, according to an exemplary embodiment of the present invention, an insulating layer is on an outer surface of a case, one electrode terminal is electrically connected to the case, and a short-circuit unit is adapted to short-circuit another electrode terminal and the case by swelling the case, thereby preventing or reducing overcharging. That is, since charged current is discharged by the short-circuit while charging is continuous without current interruption, an increase of voltage and temperature can be prevented or reduced.

DESCRIPTION OF REFERENCE NUMERALS INDICATING SOME ELEMENTS IN THE DRAWINGS

Figure 1:
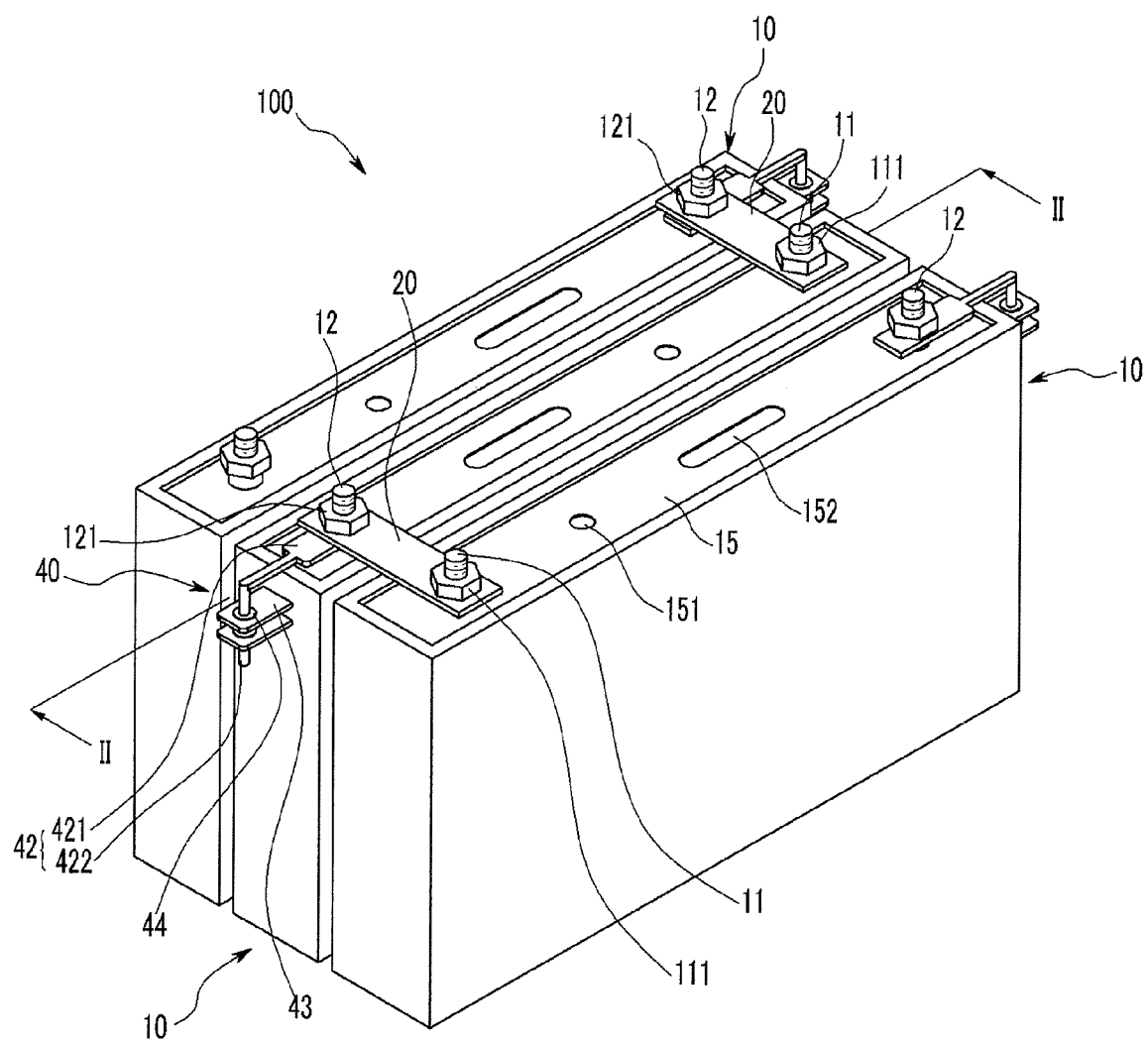
FIG. 1 is a perspective view of a rechargeable battery module according to an exemplary embodiment of the present invention.

| | |
|---|---|
| 10: | Unit cell |
| 100: | Rechargeable battery module |
| 11, 12: | Positive and negative electrode terminals |
| 111, 121: | Nuts |
| 13: | Electrode assembly |
| 14: | Case |
| 141, 142, 143, 144, 145: | First to fifth surfaces of case |
| 146: | Cell barrier |
| 147: | Flow passage |
| 15: | Cap plate |
| 151: | Sealing closure |
| 152: | Vent portion |
| 153: | Terminal hole of cap plate |
| 16, 17: | Outer and inner insulators |
| 18: | Insulating layer |
| 19: | Connecting member |
| 20: | Bus bar |
| 21: | Terminal hole of bus bar |
| 31, 32: | Positive and negative electrodes |
| 31a, 32a: | Uncoated region |
| 33: | Separator |
| 34: | Current collecting member |
| 40: | Short-circuit unit |
| 41: | Swelling induction unit |
| 42: | Short-circuit member |
| 421: | Mounting portion |
| 422: | Short-circuit end |
| 43: | Bracket |
| 44: | Insulating member |
| T1, T2: | First and second thicknesses |

DETAILED DESCRIPTION

Hereinafter, the present invention will be described more fully with reference to the accompanying drawings, in which exemplary embodiments of the invention are shown. As those skilled in the art would realize, the described embodiments may be modified in various ways, all without departing from the spirit or scope of the present invention. Accordingly, the drawings and description are to be regarded as illustrative in nature and not restrictive. Like reference numerals designate like elements throughout the specification.

FIG. 1 is a perspective view of a rechargeable battery module according to an exemplary embodiment of the present invention. Referring to FIG. 1, a rechargeable battery module 100 according to one exemplary embodiment includes two or more unit cells 10 that are sequentially disposed adjacent to each other and one or more bus bars 20 connecting the unit cells 10 to each other in series.

The bus bar 20 connects a positive electrode terminal 11 of one of the unit cells 10 with a negative electrode terminal 12 of another adjacent one of the unit cells 10 in series to form the high-output rechargeable battery module 100. An output of the rechargeable battery module 100 is dependent on the number of unit cells 10 that are connected to each other in series.

Figure 2A:
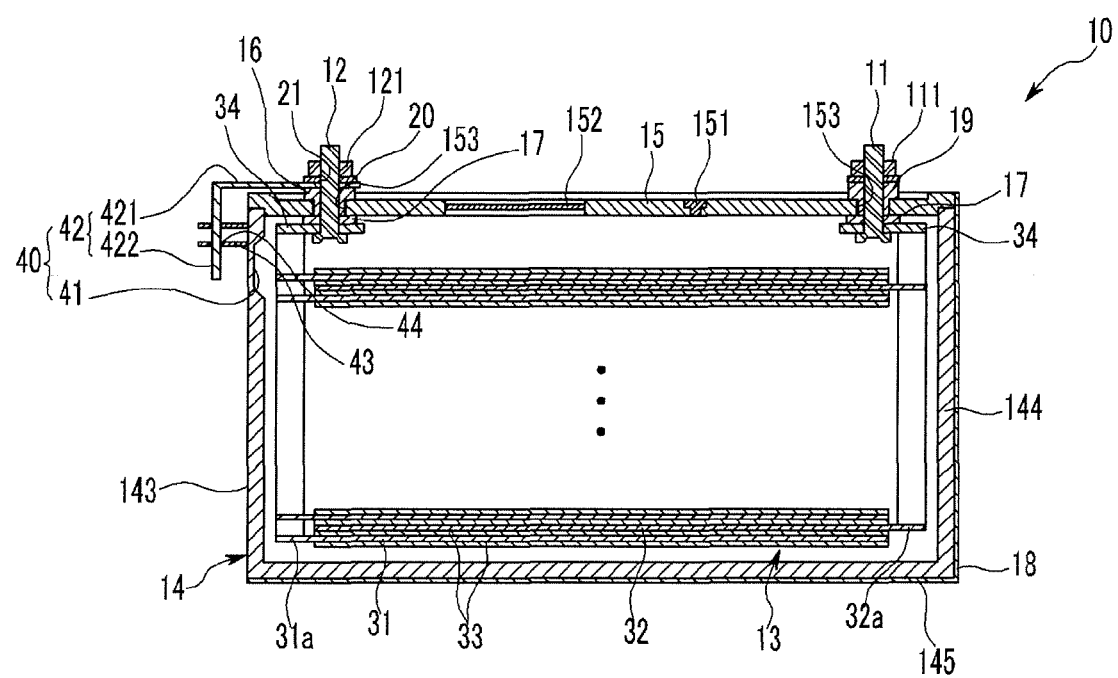
FIG. 2A is a cross-sectional view of a unit cell of the rechargeable battery module of FIG. 1 taken along line II-II before operation of a short-circuit unit of the rechargeable battery module.
Figure 2B:
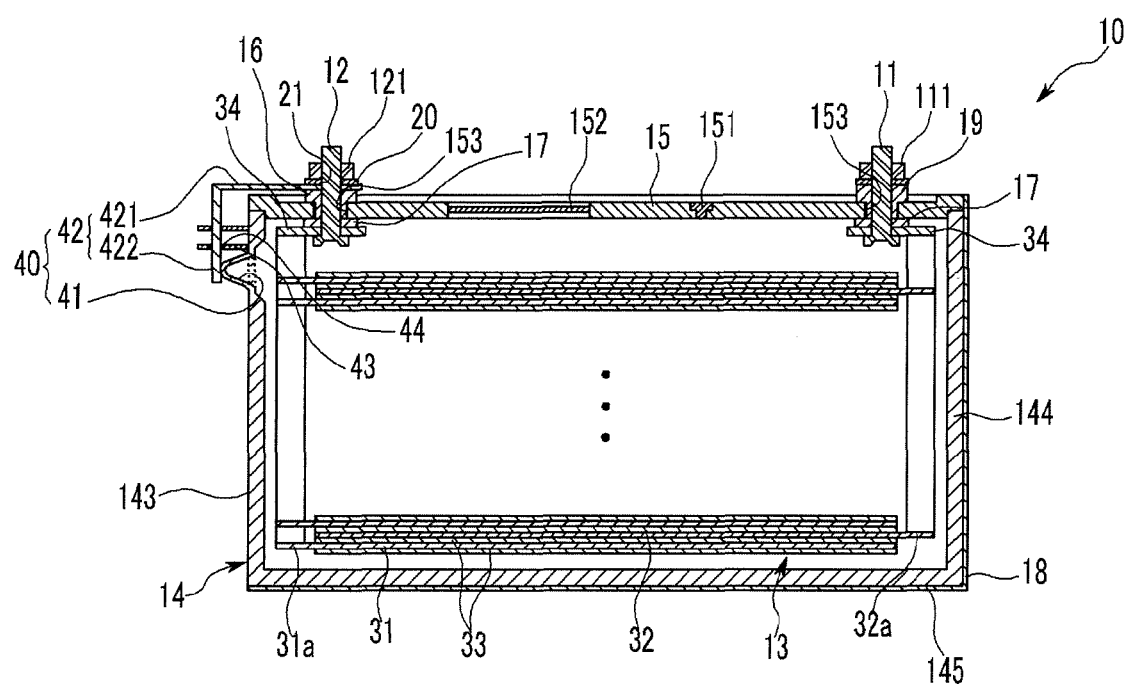
FIG. 2B is a cross-sectional view of a unit cell of the rechargeable battery module of FIG. 1 taken along line II-II after operation of a short-circuit unit of the rechargeable battery module.
Figure 3:
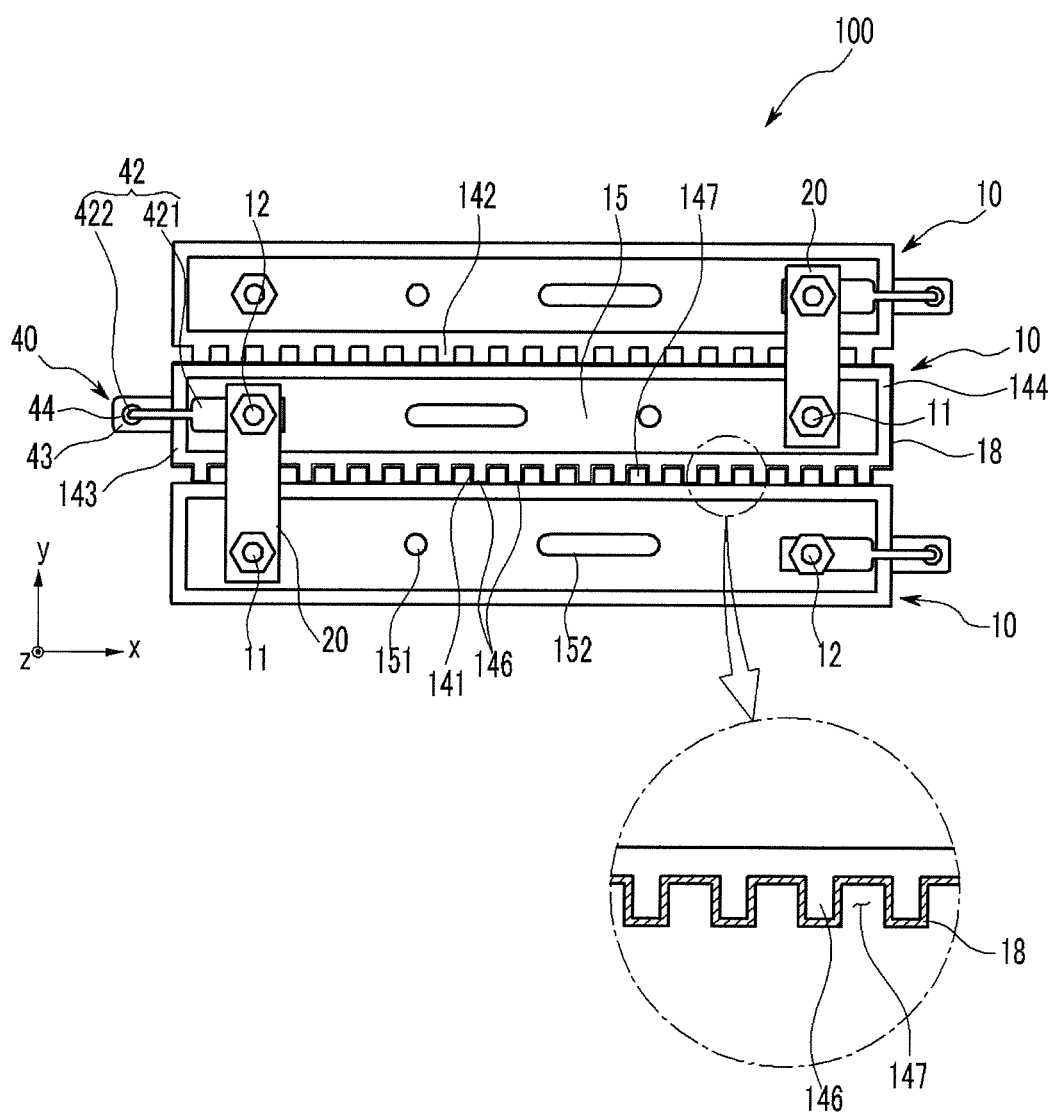
FIG. 3 is a plan view of the rechargeable battery module of FIG. 1.

FIG. 2A is a cross-sectional view of one of the unit cells 10 of the rechargeable battery module 100 taken along line II-II of FIG. 1 before operation of a short-circuit unit of the rechargeable battery module, and FIG. 2B is a cross-sectional view of one of the unit cells 10 of the rechargeable battery module 100 taken along line II-II of FIG. 1 after operation of a short-circuit unit of the rechargeable battery module. FIG. 3 is a plan view of the rechargeable battery module 100. Referring to FIGS. 2A, 2B, and 3, the unit cells 10 form the rechargeable battery module 100 that includes the positive electrode terminal 11 and the negative electrode terminal 12.

In one embodiment, each of the unit cells 10 includes an electrode assembly 13 that is connected to the positive electrode terminal 11 and the negative electrode terminal 12, a case 14 that contains the electrode assembly 13 and is electrically connected to the positive electrode terminal 11 via a connecting member 19 (shown in FIG. 2A), a cap plate 15 that covers an opening formed at one side of the case 14, an outer insulator 16 that is installed on an outer surface of the cap plate 15, and one or more inner insulators 17 that are installed on an inner surface of the cap plate 15.

The unit cell 10, in one embodiment, further includes an insulating layer 18 that is formed on an outer surface of the case 14. The insulating layer 18 may be formed by an insulating sheet that is attached with an insulating material or by an insulation coated layer that is coated with an insulating material. The unit cell 10 further includes a short-circuit unit 40 configured to short-circuit the negative electrode terminal 12 to the case 14 by swelling of the case 14, in which a portion of the case 14 swells in an overcharge condition.

The electrode assembly 13 may be formed in a jelly roll shape by disposing a positive electrode 31 and a negative electrode 32 on both surfaces of a separator 33, respectively, and winding the positive electrode 31, the negative electrode 32, and the separator 33 all together.

Each of the positive electrode 31 and the negative electrode 32 may include a coated region where a current collector formed of a thin metal foil is coated with an active material and an uncoated region 31a and 32a where the current collector is not coated with the active material.

The uncoated regions 31a and 32a are formed at side ends of the positive electrode 31 and the negative electrode 32, respectively, in longitudinal directions of the positive electrode 31 and the negative electrode 32 and at side ends opposite to each other. The uncoated regions 31a and 32a are connected to the positive electrode terminal 11 and the negative electrode terminal 12, respectively, through respective current collecting members 34.

The case 14 forms an entire exterior of the unit cell 10 and is made of a conductive metal such as aluminum, an aluminum alloy, or nickel-plated steel. The case 14 forms a space incorporating the electrode assembly 13. For example, the case 14 may have a prismatic hexahedron shape.

In one embodiment, the case 14 includes a pair of first and second surfaces 141 and 142 (see FIG. 3), each having a substantially same area (e.g., an area formed by a length and a height of the case 14) and facing each other; a pair of third and fourth surfaces 143 and 144 each having a substantially same area (e.g., an area formed by a width and the height of the case 14) smaller than the area of the first and second surfaces 141 and 142 and facing each other at two sides between the first and second surfaces 141 and 142; and a fifth surface 145 at another side between the first and second surfaces 141 and 142 and having an area (e.g., an area formed by the length and the width of the case 14) smaller than the area of the first and second surfaces 141 and 142. The fifth surface 145 forms a side of the case 14 opposite to an opening of the case 14.

The cap plate 15 may be formed of a thin plate and is joined to the opening formed at one side of the case 14 and seals the opening. The cap plate 15 may have an electrolyte injection opening (not shown) for injecting an electrolyte into the inside of the sealed case 14.

The electrolyte injection opening is sealed with a sealing closure 151 after injecting the electrolyte. The cap plate 15 may have a vent portion 152 cut depending on an internal pressure set to prevent explosion of the unit cell 10.

The cap plate 15 has a pair of terminal holes 153 that each receive one of the positive electrode terminal 11 and the negative electrode terminal 12 therethrough. The positive electrode terminal 11 and the negative electrode terminal 12 are joined to the terminal holes 153 of the cap plate 15 to be connected to a respective current collecting member 34 in the case 14 and be connected to the electrode assembly 13 through the current collecting member 34.

In one embodiment, the outer insulator 16 is partially inserted into the terminal hole 153 of the negative electrode terminal 12 outside of the cap plate 15 to electrically insulate the negative electrode terminal 12 from the cap plate 15. That is, the outer insulator 16 insulates the negative electrode terminal 12 from the outer surface of the cap plate 15 and, at the same time, insulates the negative electrode terminal 12 from an inner surface of the terminal hole 153 of the cap plate 15 of the negative electrode terminal 12. In an exemplary embodiment of the outer insulator 16, a part corresponding to the outer surface of the cap plate 15 and a part corresponding to the inner surface of the terminal hole 153 are integrally formed, but may alternatively be formed separate from each other (not shown).

The bus bar 20 is provided with a pair of terminal holes 21 that correspond to the positive electrode terminal 11 and the negative electrode terminal 12 of the adjacent unit cells 10. The bus bar 20 is installed on the outer insulator 16 of each of the adjacent unit cells 10 by inserting the positive electrode terminal 11 and the negative electrode terminal 12 through the terminal holes 21. Nuts 111 and 121 are joined to the positive electrode terminal 11 and the negative electrode terminal 12, respectively, such that the bus bar 20 connects the positive electrode terminal 11 and the negative electrode terminal 12 to each other in series in a pair of unit cells 10. In the described embodiment, the outer insulator 16 supports the bus bar 20 and is between the cap plate 15 and the bus bar 20 (see FIG. 2A).

The inner insulators 17 are provided to correspond to the terminal holes 153 inside of the cap plate 15 and electrically insulate the current collecting members 34 from the cap plate 15 on the inner surface of the cap plate 15. In one embodiment, each of a pair of current collecting members 34 connects the positive electrode 31 and the negative electrode 32 of the electrode assembly 13 to the positive electrode terminal 11 and the negative electrode terminal 12, respectively.

In the unit cell 10 of an exemplary embodiment, the positive electrode terminal 11 is electrically connected to the case 14 through the connecting member 19, but the negative electrode terminal 12 and the case 14 are insulated from each other for normal operation of the unit cell 10. The connecting member 19 may be made of conductive material such as copper or aluminum.

Further, in other embodiments of the unit cell 10, the negative electrode terminal 12 may be electrically connected to the case 14 and the positive electrode terminal 11 and the case 14 may be insulated from each other (not shown). In these embodiments, in an overcharge condition, the short-circuit unit 40 may short-circuit the positive electrode terminal 11 and the case 14 to each other.

When the unit cell 10 is overcharged (see FIGS. 2B and 4B) and deviating from a normal operating range (see FIGS. 2A and 4A), the short-circuit unit 40 short-circuits the negative electrode terminal 12 to the case 14. As a result, while current charging is continuous, the short-circuit unit 40 discharges current by electrically connecting the case 14 and the negative electrode terminal 12, thereby preventing additional increases of voltage and temperature of the unit cell 10. As a result, safety of the unit cell 10 from overcharge is secured.

The outer insulator 16 and the inner insulator 17 insulate the negative electrode terminal 12 and the case 14 from each other, and the short-circuit unit 40 selectively short-circuits the negative electrode terminal 12 and the case 14 to each other in an overcharge condition. As such, the outer insulator 16 and the inner insulator 17 and the short-circuit unit 40 perform opposite functions.

In an exemplary embodiment, the short-circuit unit 40 is formed on one surface of the case 14, that is, either one of the third and fourth surfaces 143 and 144, and the insulating layer 18 is formed on other surfaces of the case 14 where the short-circuit unit 40 is not formed. In one exemplary embodiment, the short-circuit unit 40 is formed on the third surface 143 of the case 14 and the insulating layer 18 is formed on the first, second, fourth, and fifth surfaces 141, 142, 144, and 145. The insulating layer 18 may be further formed on a part of the third surface 143 except for a part corresponding to the short-circuit unit 40 (not shown).

Further, in one embodiment, either one of the first and second surfaces 141 and 142 (e.g., the first surface 141, as shown in FIG. 3) is provided with cell barriers 146 to form flow passages 147 therebetween for passage of a heat transmission medium. The cell barriers 146 extend in a first direction (e.g., along the z-axis direction of FIG. 3) and are spaced from each other at a predetermined interval in a second direction (e.g., the x-axis direction of FIG. 3) that crosses the z-axis direction.

That is, each of the flow passages 147 is formed as a space between adjacent ones of the cell barriers 146 that are formed on the first surface 141 of one unit cell 10 of two adjacent unit cells 10 and the second surface 142 of the other unit cell 10 of the two adjacent unit cells 10.

Further, the insulating layer 18 formed on the first surface 141 is also formed on outer surfaces of the cell barriers 146 formed on the first surface 141. The insulating layer 18 formed on the cell barriers 146 prevents the cases 14 that are electrically connected to the positive electrode terminal 11 in the adjacent unit cells 10 from being connected in series.

The short-circuit unit 40, in an exemplary embodiment, includes a swelling induction unit 41 formed on the third surface 143 of the case 14 and a short-circuit member 42. The swelling induction unit 41 is formed on the case 14, and the short-circuit member 42 faces the swelling induction unit 41 and is connected to the negative electrode terminal 12.

Figure 4A:
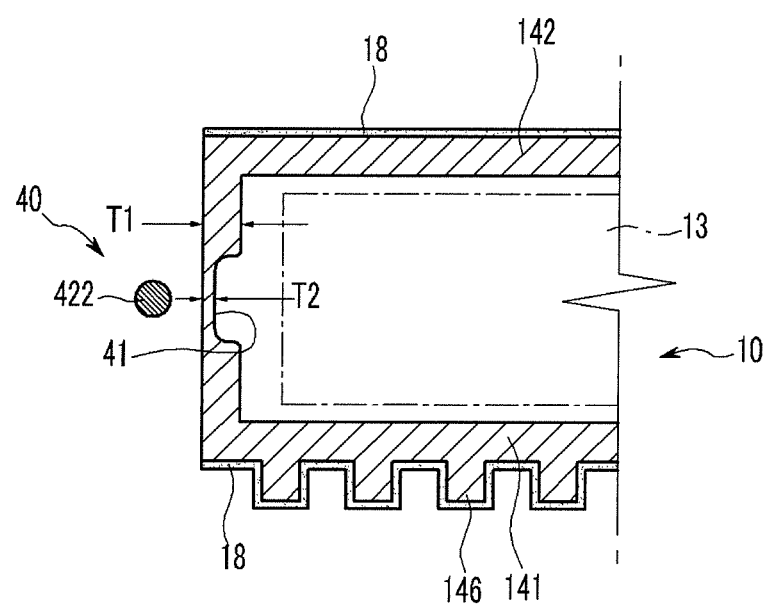
FIG. 4A is a cross-sectional view of a short-circuit unit of the rechargeable battery module of FIG. 1 before operation.
Figure 4B:
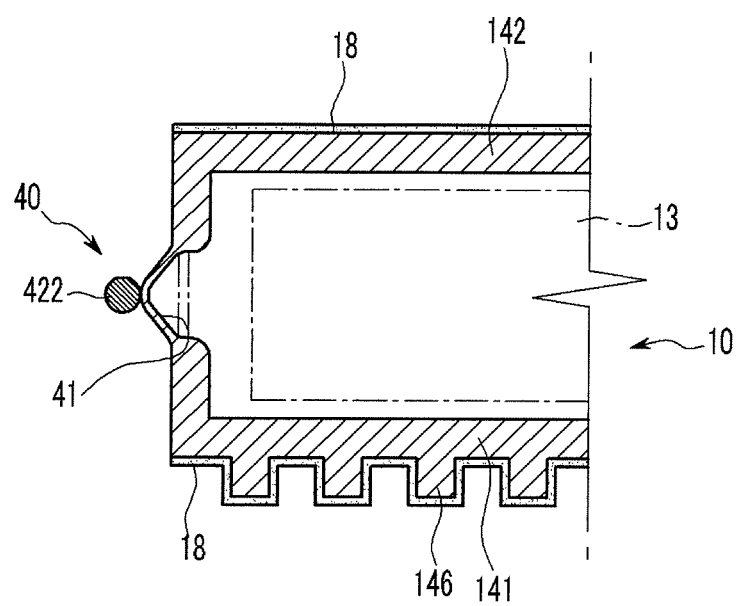
FIG. 4B is a cross-sectional view of a short-circuit unit of the rechargeable battery module of FIG. 1 after operation.

FIGS. 4A and 4B are cross-sectional views of the short-circuit unit 40 of the rechargeable battery module 100 before and after operation (e.g., due to an overcharge condition), respectively. Referring to FIG. 4A, the swelling induction unit 41 is formed on the third surface 143 of the case 14 and has a second thickness T2 that is thinner than a first thickness T1 of the surrounding portions of the third surface 143 (see also FIG. 2A). As a result, when an internal pressure inside the case 14 increases, the first to fifth surfaces 141 to 145, including the portion of the third surface 143 having the first thickness T1, are not expanded, but the swelling induction unit 41 of the third surface 143 may be expanded, or bulged, before the other surfaces (see FIGS. 2B and 4B). For example, the swelling induction unit 41 is concave on an inner surface of the third surface 143 and is configured to bulge outwardly in the region having the second thickness T2 due to the internal pressure.

The short-circuit member 42 is electrically connected to the negative electrode terminal 12 at one side thereof and faces an outer surface of the swelling induction unit 41 at the other side thereof. That is, in one embodiment, the short-circuit member 42 includes a mounting portion 421 that is mounted on the negative electrode terminal 12 and a short-circuit end 422 that faces the swelling induction unit 41, and the short-circuit member 42 is bent between the mounting portion 421 and the short-circuit end 422 (e.g., bent from a horizontal orientation at the mounting portion 421 to a vertical orientation at the short-circuit end 422). Therefore, when the swelling induction unit 41 is expanded, or bulged, the portion of the third surface 143 having the second thickness T2, that is, the swelling induction unit 41, and the short-circuit member 42 may be electrically short-circuited to each other. That is, when the swelling induction unit 41 and the short-circuit end 422 are short-circuited to each other, each of the negative electrode terminal 12, the mounting unit 421, the short-circuit end 422, and the swelling induction unit 41 are electrically connected to each other. As a result, since the swelling induction unit 41 is electrically connected to the positive electrode terminal 11 on the third surface 143 of the case 14, the positive electrode terminal 11 and the negative electrode terminal 12 are short-circuited to each other. Accordingly, since charged current is discharged through the short-circuit member 42 even though charging is continuous in the unit cell 10, safety against overcharge is secured.

Further, the short-circuit unit 40 may include a bracket 43 and an insulating member 44. The bracket 43 is connected to the third surface 143 of the case 14 to stably support the short-circuit end 422, thereby preventing the short-circuit end 422 from being unnecessarily short-circuited to the swelling induction unit 41. The insulating member 44 is interposed between the portion of the short-circuit end 422 penetrating the bracket 43 and the bracket 43 to electrically insulate the short-circuit end 422 and the bracket 43 from each other.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   a case containing an electrode assembly;
   a cap plate coupled to the case and sealing an opening of the case;
   a first electrode terminal connected to a first electrode of the electrode assembly and electrically connected to the case;
   a second electrode terminal connected to a second electrode of the electrode assembly and electrically insulated from the case when a pressure inside the case is less than a threshold pressure; and
   a short-circuit unit comprising a short-circuit member connected to the second electrode terminal, the short-circuit unit adapted to short-circuit the second electrode terminal to the case by swelling a portion of the case to contact and electrically connect to the short-circuit member when the pressure inside the case is equal to or greater than the threshold pressure,
   wherein the short-circuit unit further comprises a swelling induction unit comprising the portion of the case, the portion of the case having a thickness that is less than a thickness of another portion of the case surrounding the portion, and wherein the short-circuit member faces and is contactable with an outer surface of the portion of the case.

2. The rechargeable battery of claim 1, wherein the case has a prismatic hexahedron shape, and the short-circuit unit is on a surface of the case.

3. The rechargeable battery of claim 1, wherein the case comprises:
   a first surface and a second surface facing each other and each having a substantially same first area;
   a third surface and a fourth surface facing each other and being between the first and second surfaces, each of the third and fourth surfaces having a substantially same second area smaller than the first area; and
   a fifth surface facing the opening and having a width substantially equal to a width of the third and fourth surfaces.

4. The rechargeable battery of claim 3, wherein the short-circuit unit is on the third surface or the fourth surface.

5. The rechargeable battery of claim 4, further comprising an insulating layer on outer surfaces of the case other than the surface having the short-circuit unit thereon.

6. The rechargeable battery of claim 3, wherein the first surface or the second surface extends in a first direction and includes cell barriers spaced from each other in a second direction that crosses the first direction, the cell barriers defining at least one flow passage therebetween for passage of a heat transfer medium therethrough.

7. The rechargeable battery of claim 6, further comprising an insulating layer on outer surfaces of the cell barriers.

8. The rechargeable battery of claim 1, wherein the swelling induction unit is concave on an inner surface of the portion of the case, and wherein the short-circuit member comprises a mounting portion mounted to the second electrode terminal, and a short-circuit end facing and contactable with the swelling induction unit.

9. The rechargeable battery of claim 8, wherein the short-circuit member is bent between the mounting portion and the short-circuit end, the mounting portion being substantially horizontal, and the short-circuit end being substantially vertical.

10. The rechargeable battery of claim 8, wherein the short-circuit unit further comprises a bracket connected to the case and supporting the short-circuit end, and an insulating member between the short-circuit end and the bracket.

11. The rechargeable battery of claim 1, wherein the first electrode terminal is a positive electrode terminal, and the second electrode terminal is a negative electrode terminal.

12. The rechargeable battery of claim 1, further comprising:
   an outer insulator on at least an outer surface of the cap plate; and
   an inner insulator on an inner surface of the cap plate,
   wherein the outer and inner insulators receive the second electrode terminal therethrough and electrically insulate the second electrode terminal from the cap plate.

13. A rechargeable battery module comprising:
   a plurality of unit cells adjacent one another; and
   at least one bus bar connecting unit cells of the plurality of unit cells to each other in series,
   wherein a unit cell of the plurality of unit cells comprises:
      a case containing an electrode assembly;
      a cap plate coupled to the case and sealing an opening of the case;
      a first electrode terminal connected to a first electrode of the electrode assembly and electrically connected to the case;
      a second electrode terminal connected to a second electrode of the electrode assembly and electrically insulated from the case when a pressure inside the case is less than a threshold pressure; and
      a short-circuit unit comprising a short-circuit member connected to the second electrode terminal, the short-circuit unit adapted to short-circuit the second electrode terminal to the case by swelling a portion of the case to contact and electrically connect to the short-circuit member when the pressure inside the case is equal to or greater than the threshold pressure,
      wherein the short-circuit unit comprises a swelling induction unit comprising the portion of the case, the portion of the case having a thickness that is less than a thickness of another portion of the case surrounding the portion, and wherein the short-circuit member faces and is contactable with an outer surface of the portion of the case.

14. The rechargeable battery module of claim 13, wherein the swelling induction unit is concave on an inner surface of the portion of the case, and wherein the short-circuit member comprises a mounting portion mounted to the second electrode terminal, and a short-circuit end facing and contactable with the swelling induction unit.

15. The rechargeable battery module of claim 14, wherein the short-circuit member is bent between the mounting portion and the short-circuit end, the mounting portion being substantially horizontal, and the short-circuit end being substantially vertical.

16. The rechargeable battery module of claim 14, wherein the short-circuit unit further comprises a bracket connected to the case and supporting the short-circuit end, and an insulating member between the shod-circuit end and the bracket.

17. The rechargeable battery module of claim 13, wherein the unit cell of the plurality of unit cells further comprises an insulating layer on an outer surface of the case.

18. The rechargeable battery module of claim 13, wherein the first electrode terminal of the unit cell is a positive electrode terminal, and the second electrode terminal of the unit cell is a negative electrode terminal.

* * * * *

UNITED STATES PATENT AND TRADEMARK OFFICE
CERTIFICATE OF CORRECTION

PATENT NO.         : 8,557,418 B2                                     Page 1 of 1
APPLICATION NO.    : 12/711859
DATED              : October 15, 2013
INVENTOR(S)        : Sang-Won Byun et al.

It is certified that error appears in the above-identified patent and that said Letters Patent is hereby corrected as shown below:

In the Claims

Column 10, Claim 16, line 31      Delete "shod-circuit"

Insert -- short-circuit --

Signed and Sealed this
Twenty-first Day of April, 2015

Michelle K. Lee
*Director of the United States Patent and Trademark Office*